(12) United States Patent
Ohishi et al.

(10) Patent No.: US 6,473,166 B1
(45) Date of Patent: Oct. 29, 2002

(54) AUTOMATIC SURVEYING EQUIPMENT AND THREE-DIMENSIONS MEASURING METHOD

(75) Inventors: Masahiro Ohishi; Katsumi Yanai, both of Tokyo (JP)

(73) Assignee: Kabushiki Kaisha Topcon, Tokyo (JP)

( * ) Notice: Subject to any disclaimer, the term of this patent is extended or adjusted under 35 U.S.C. 154(b) by 0 days.

(21) Appl. No.: 09/493,836

(22) Filed: Jan. 28, 2000

(30) Foreign Application Priority Data

Jan. 29, 1999 (JP) .......................................... 11-021137

(51) Int. Cl.$^7$ .................. G01B 11/26; G01B 21/28; G01C 3/08
(52) U.S. Cl. .................. 356/141.1; 356/4.01; 356/379; 356/4.03; 702/156; 702/159
(58) Field of Search .............................. 356/379, 141.1, 356/4.01, 141.03; 702/156, 159

(56) References Cited

U.S. PATENT DOCUMENTS 4,477,184 A * 10/1984 Enoo
6,057,909 A * 5/2000 Yahav et al. ................ 356/5.04
6,246,468 B1 * 6/2001 Dimsdale ................... 356/4.02

* cited by examiner

*Primary Examiner*—Stephen C. Buczinski
(74) *Attorney, Agent, or Firm*—BakerBotts LLP

(57) ABSTRACT

The present invention relates to a non-prism type automatic surveying apparatus and a three-dimensions measuring method or the like, which measure a distance to an object to be measured without using a reflecting prism or the like. A lightwave range finder capable of performing non-prism measurements has an angle measuring unit and a distance measuring unit. Arithmetic processing means for recognition can recognize an object to be measured according to image processing. The angle measuring unit and the distance measuring unit can respectively measure distances to and angles relative to at least three specified points on a plane α including measuring points of the object to be measured. The angle measuring unit can measure angles relative to each individual measuring points. A computing unit can determine an equation for specifying the plane α from the distances to and angles relative to the specified points, determine an equation indicative of a straight line for connecting the measuring points from the angles relative to the measuring points, and compute a measuring point corresponding to a point where the plane α and the straight line intersect.

24 Claims, 10 Drawing Sheets

AUTOMATIC SURVEYING EQUIPMENT AND THREE-DIMENSIONS MEASURING METHOD

BACKGROUND OF THE INVENTION

The present invention relates to non-prism type automatic surveying equipment and a three-dimensions measuring method or the like, which measure a distance to an object to be measured without using specific reflecting means (reflecting prism or the like) used for distance measurements, and particularly to an automatic surveying apparatus and a three-dimensions measuring method or the like, which are capable of computing arbitrary three-dimensional coordinate positions, distances and areas or the like from distance and angular data, etc.

A piece of conventional automatic surveying equipment or apparatus has performed collimation measurements using reflecting prisms located at necessary points and carried out instrumentation. When, for example, an architecture is measured, reflecting prisms are placed in predetermined measuring positions, the corners of the architecture, the corners of a window frame, etc. Further, the automatic surveying apparatus is directed substantially toward the architecture to start measuring.

The automatic surveying apparatus rotates a collimator so that it scans a predetermined range and successively detects the reflecting prisms placed in predetermined positions. This type of collimator can be rotated vertically and horizontally by motor-driven means and is capable of automatically performing collimation at each arbitrary position. An angle detector is attached to each of a vertical rotatable shaft and a horizontal rotatable shaft used to rotate the collimator and is constructed so as to be able to detect the direction of the rotated collimator.

The collimator applies scanning light to each reflecting prism placed in the predetermined position. When the scanning light is reflected from each reflecting prism, the reflected light is launched into the collimator again. The reflected light is converted to a light-detected signal by a photoreceptor or light receiving element. Thereafter, the direction of the collimator is specified based on an angular signal of the angle detector attached to each of the vertical rotatable shaft and the horizontal rotatable shaft. Further, the distance to each reflecting prism is measured by a lightwave range finding device, so that the position up to the corresponding reflecting prism is specified.

Further, each measured value to be determined is converted on a plane-coordinate system map, based on the position of the automatic surveying apparatus, which is a known point.

However, the conventional automatic surveying apparatus has a problem in that although the reflecting prisms must be placed in the predetermined positions of the object to be measured and there is an advantage in measuring a number of measuring points plural times, survey working terminated in one measurement involves much waste and reduces working efficiency.

Further, a problem arises in that when the outside shape of an architecture is measured as in the case of sections or the like of a building, a tunnel, etc., a reflecting prism must be placed in an external exposed point, thus entailing danger.

SUMMARY OF THE INVENTION

The present invention relates to a non-prism type automatic surveying apparatus and a three-dimensions measuring method or the like, which measure a distance to an object to be measured without using a reflecting prism or the like. A lightwave range finder capable of performing non-prism measurements has an angle measuring unit and a distance measuring unit. Arithmetic processing means for recognition can recognize an object to be measured according to image processing. The angle measuring unit and the distance measuring unit can respectively measure distances to and angles relative to at least three specified points on a plane α including measuring points of the object to be measured. The angle measuring unit can measure angles relative to each individual measuring points. A computing unit can determine an equation for specifying the plane α from the distances to and angles relative to the specified points, determine an equation indicative of a straight line for connecting the measuring points from the angles relative to the measuring points, and compute a measuring point corresponding to a point where the plane α and the straight line intersect.

A typical one of various inventions of the present inventions has been shown in brief. However, the various inventions of the present application and specific configurations of these inventions will be understood from the following description.

BRIEF DESCRIPTION OF THE DRAWINGS

An embodiment of the present invention will be described by the accompanying drawings, in which.

DESCRIPTION OF THE INVENTION

An embodiment of the present invention will be explained based on the accompanying drawings.

Figure 1:
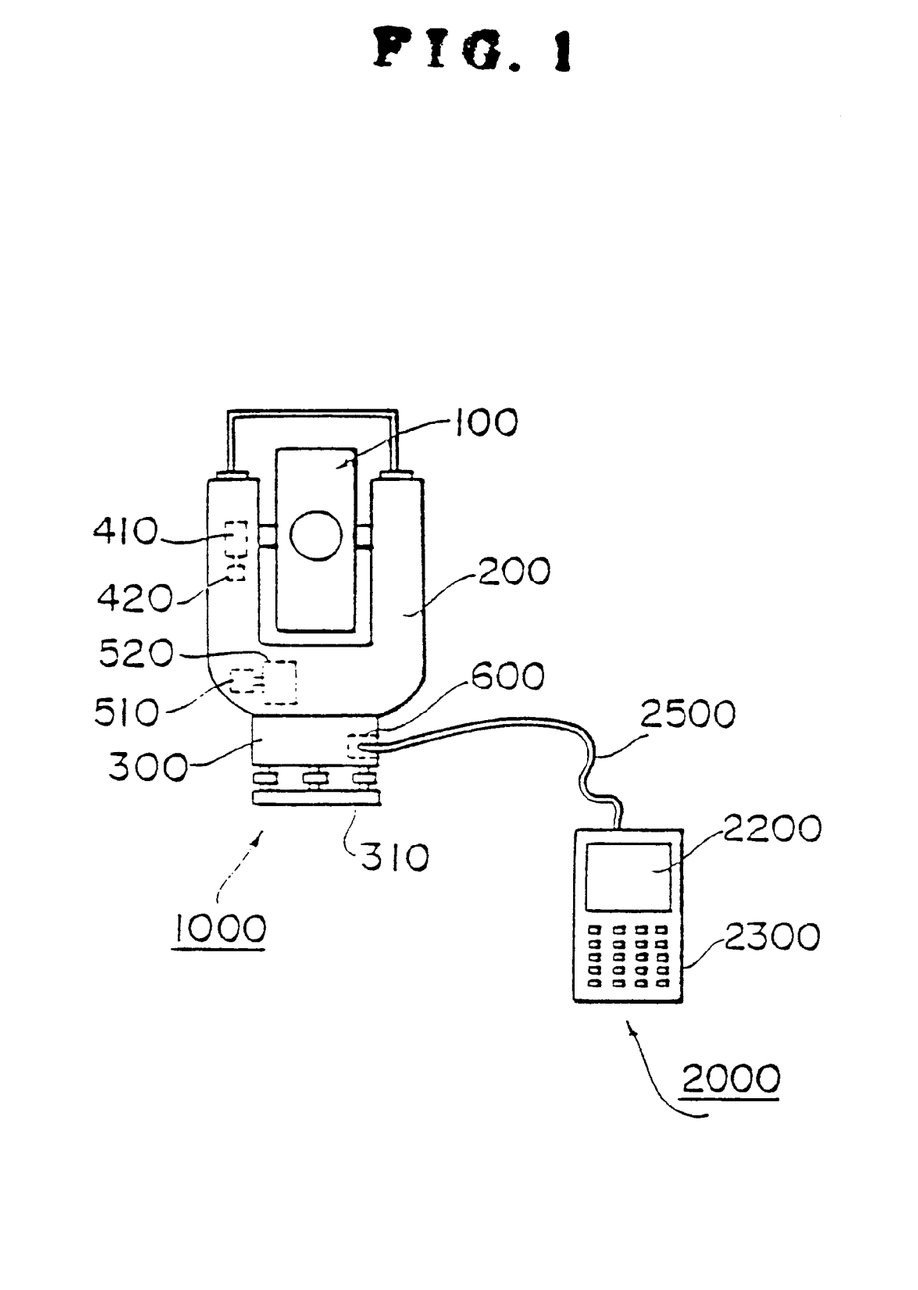
FIG. 1 is a diagram showing automatic surveying equipment illustrative of the embodiment of the present invention and a data collector.

FIG. 1 is a diagram showing a piece of automatic surveying equipment or apparatus 1000 according to the present embodiment.

The automatic surveying equipment 1000 comprises a telescope 100, a support member 200 for rotatably supporting the telescope 100 within a vertical plane, a basement 300 for allowing the telescope 100 to rotate within a horizontal plane, first driving means 400 for rotating the telescope 100, second driving means 500 formed in the basement 300 and for rotating the support member 200, and an input/output terminal 600 for connecting to an external storage and display device such as a data collector 2000 or the like.

The first driving means 400 comprises first decelerating means 410 and an elevation motor 420. The second driving means 500 comprises second decelerating means 510 and a horizon motor 520.

Figure 2:
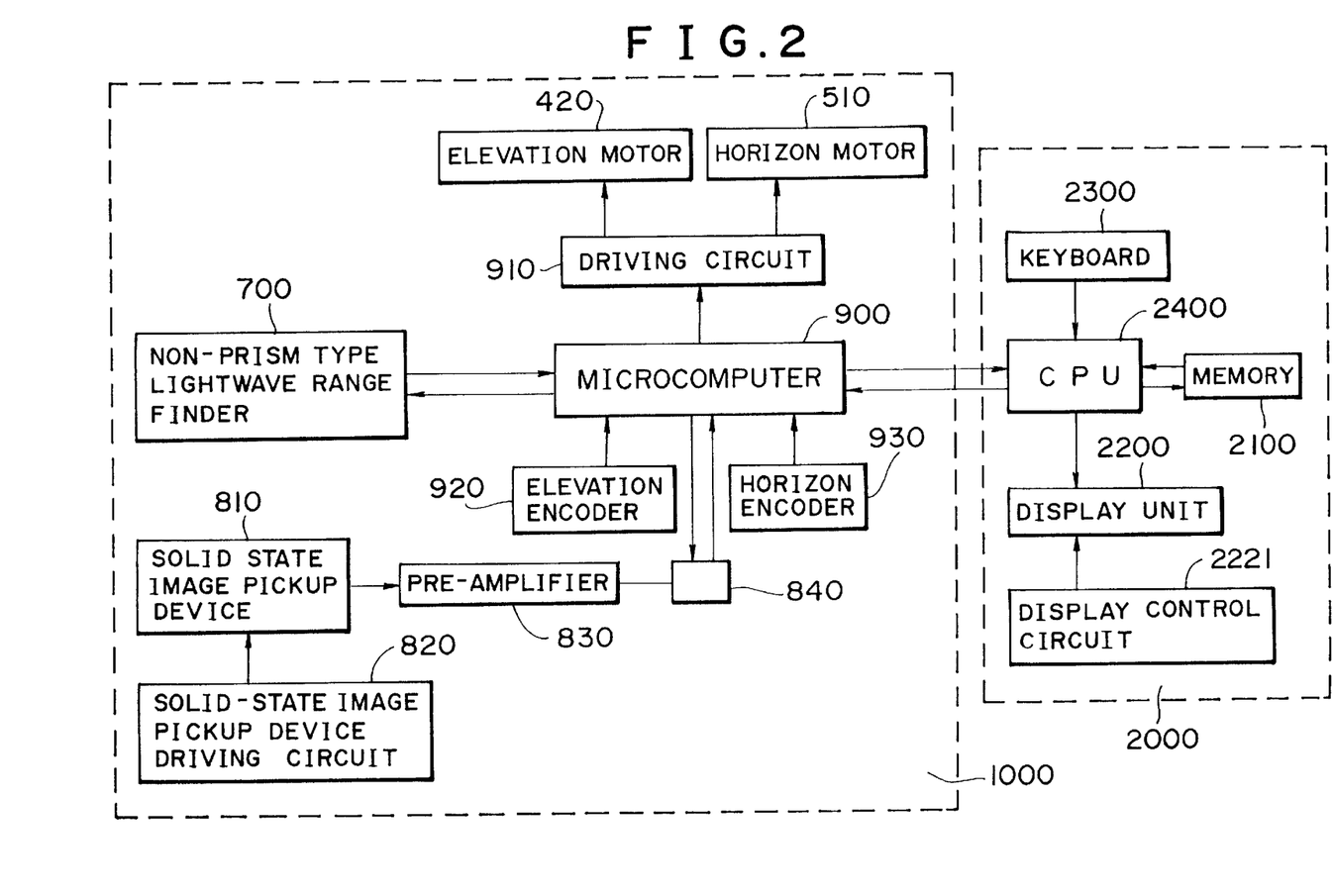
FIG. 2 is a diagram for describing an electrical configuration of the embodiment of the present invention.

FIG. 2 is a diagram showing electrical configurations of the automatic surveying equipment 1000 according to the present embodiment and the data collector 2000.

The automatic surveying equipment 1000 comprises a distance measurable non-prism type lightwave range finder 700 which no requires specific reflecting means (reflecting prism or the like) used for distance measurements, a solid-state image pickup device 810 for converting an image of a target to an electric signal, solid-state image pickup device driving means 820 for driving the solid-state image pickup device 810, a pre-amplifier 830 for amplifying a signal outputted from the solid-state image pickup device 810, arithmetic processing means 840 for recognition, a microcomputer 900, a driving circuit 910 for driving motors such as the elevation motor 420, the horizon motor 520, etc., an elevation encoder 920, and a horizon encoder 930.

Further, since the non-prism type lightwave range finder 700 takes a structure basically similar to a prism type, it is capable of making measurements using the reflecting prism and can measure a longer distance when the reflecting prism is used.

Figure 3:
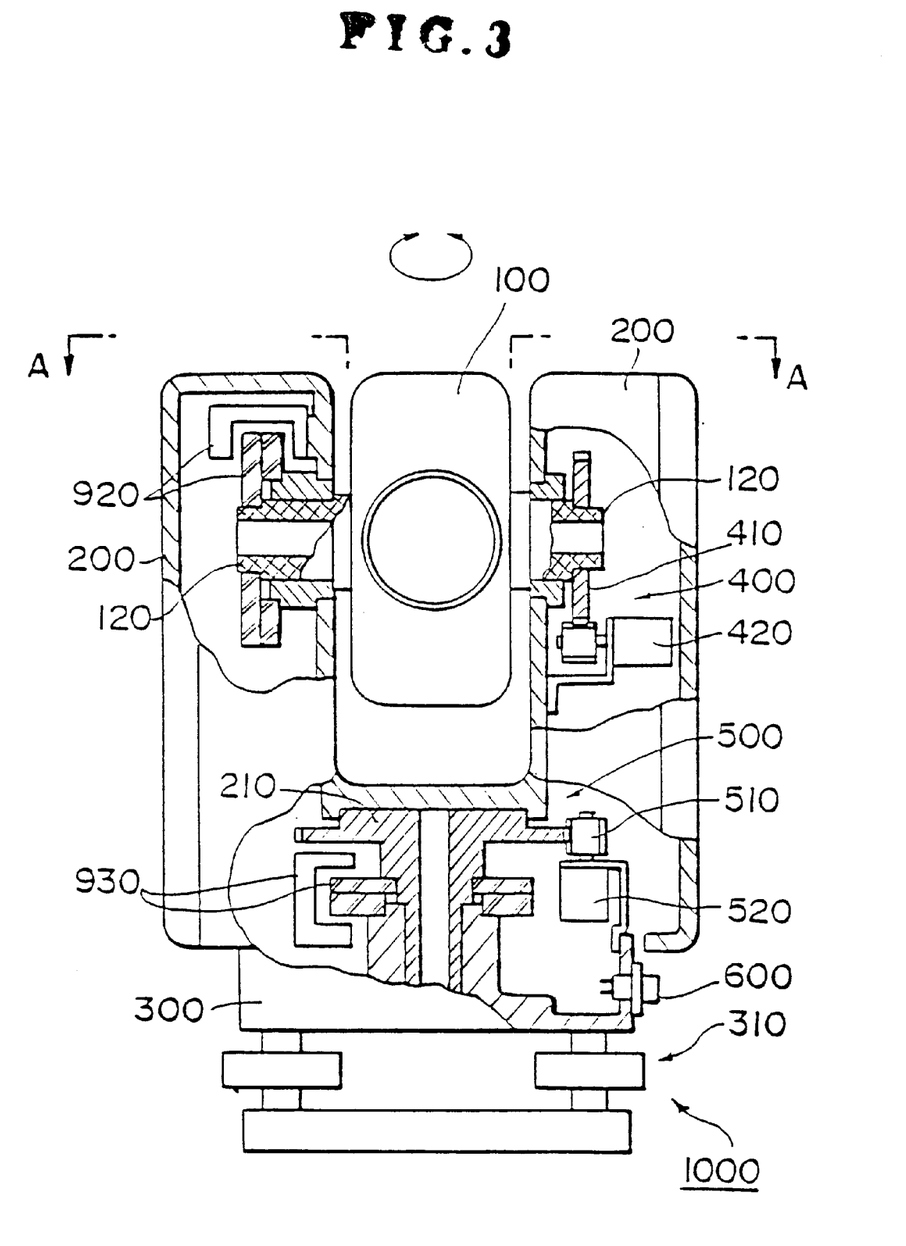
FIG. 3 is a diagram for describing the automatic surveying equipment showing the embodiment of the present invention.

The structure of the automatic surveying equipment 1000 will next be described in detail based on FIGS. 3 and 4.

The telescope 100 is one for forming an image of a target placed at a measuring point and has a telescope optical system 110. The telescope optical system 110 comprises an objective lens 111 and a collimator lens 112. The telescope 100 is rotatably supported on the support member 200 by means of a shaft member 120 and is allowed to rotate within a vertical plane (in a vertical direction). The shaft member 120 is coupled to the first driving means 400. Namely, a tooth portion formed in the shaft member 120 and a toothed wheel of the first decelerating means 410 are constructed so as to be maintained in meshing engagement with each other. A rotating force of the elevation motor 420 is transferred to the shaft member 120 through the first decelerating means 410 so that the telescope 100 can be rotated in the vertical direction.

The elevation encoder 920 is coupled to the shaft member 120 and constructed so as to be capable of detecting a vertical turning angle or angular displacement of the telescope 100.

A rotatable central shaft 210 is formed at a lower end of the support member 200 and inserted in and maintained in engagement with the basement 300. Thus, the support member 200 is rotatable within the horizontal plane with respect to the basement 300. Incidentally, since the telescope 100 is attached to the support member 200, the telescope 100 is also rotatable within the horizontal plane with respect to the basement 300.

The solid-state image pickup device 810 is placed at the focus of the collimator lens 112. The solid-state image pickup device 810 corresponds to an image pickup device and is one for converting an image of a target to an electric signal. Although an image pickup device using CCD is adopted in the present embodiment, any photoreceptor or light receiving element may be adopted if a device capable of performing photoelectric conversion is selected. Incidentally, the objective lens 111 and the collimator lens 112 correspond to a focus optical system.

Figure 4:
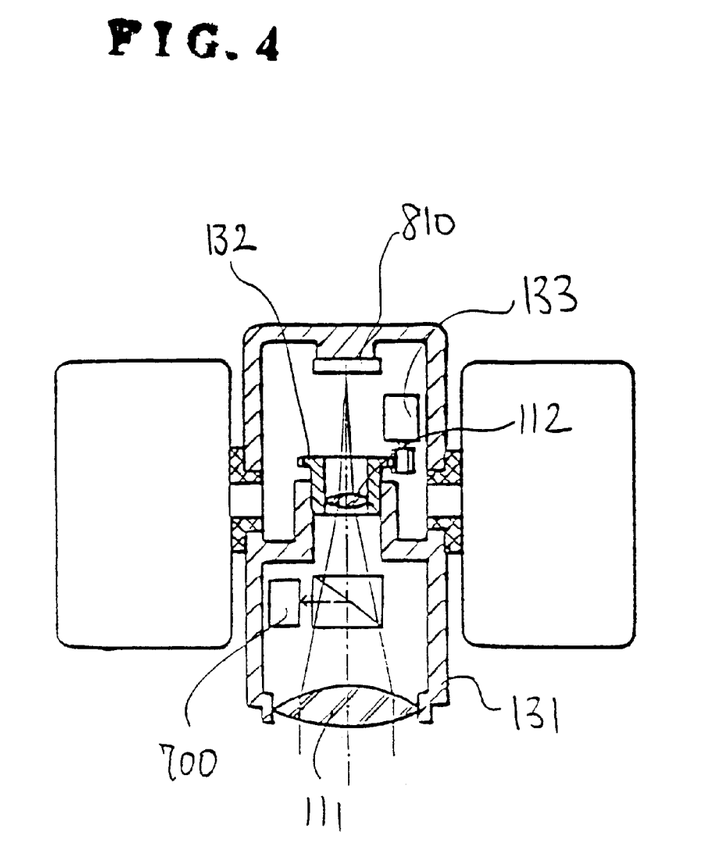
FIG. 4 is a cross-sectional view for describing the automatic surveying equipment showing the embodiment of the present invention.

Incidentally, a focus mechanism 130 is provided as shown in FIG. 4 in the present embodiment. The focus mechanism 130 comprises an objective lens frame 131 for fixing the objective lens 111, a collimator lens frame 132 for fixing the collimator lens 112, and a focusing motor 133 for rotating the collimator lens frame 132.

The objective lens 111 can be moved back and forth by rotating the focusing motor 133. Namely, it is possible to electrically perform an operation for focusing an image on the solid-state image pickup device 810. Incidentally, the focusing mechanism 130 may be set to autofocus.

The basement 300 is used to rotatably fix the support member 200. The rotatable central shaft 210 of the support member 200 is inserted and engaged in the basement 300, so that the telescope 100 can be rotated within the horizontal plane.

The second driving means 500 is formed in the basement 300 and the horizon motor 520 is fixed thereto. A rotating force of the horizon motor 520 is transferred to the rotatable central shaft 210 of the support member 200 through the second decelerating means 510, so that the support member 200 can be rotated within the horizontal plane.

The horizon encoder 930 is coupled to the rotatable central shaft 210 in such a manner that horizontal turning angles or angular displacements of the telescope 100 and the support member 200 can be detected.

Further, the input/output terminal 600 for connecting to the data collector 2000 is formed on an outer wall portion of the basement 300. The input/output terminal 600 corresponds to connecting means.

A level device 310 is provided at a lower end of the basement 300 and can be adjusted so as to fix the automatic surveying equipment 1000 to a tripod and horizontally maintain the automatic surveying equipment 1000.

Incidentally, the automatic surveying equipment 1000 incorporates the non-prism type lightwave range finder 700 therein. The lightwave range finder 700 transmits light to a target placed at a measuring point and receives light reflected from the target, and measures a distance to the target according to the difference between the time required to emit the light and the time required to receive the reflected light. Incidentally, the microcomputer 900 may be used to perform arithmetic operation on distance measurements. Alternatively, the lightwave range finder 700 may peculiarly be provided with arithmetic processing means.

A pulse semiconductor laser is used for the non-prism type lightwave range finder 700, which is pulse-driven by a laser driving circuit. A lightwave pulse emitted from a light source is introduced into a fiber on the emission side through the collimator lens so as to launch into a prism. Further, the lightwave pulse reflected by the prism passes through the objective lens and is radiated to an object to be measured.

After the lightwave pulse reflected by the object to be measured has passed through the objective lens, the lightwave pulse is reflected by the prism, followed by launching into a fiber on the light reception side. The introduced lightwave pulse is launched into a photoreceptor or light receiving element through a light-detecting lens.

As the objective lens, one having an effective diameter of several tens of mm and a focal length of about 100 mm is used. This originates in a widened angle of a light-emitting portion of the pulse semiconductor laser corresponding to the light source for emission because it is necessary to cover a certain degree of solid angle for the purpose of reducing a widened angle of emitted light and radiating it from the objective lens with efficiency.

Further, the pulse light emitted from the objective lens to the measured object spreads as it goes far away because the diameter of the fiber on the emission side has a finite size. Assuming that, for example, the focal length of an objective lens 9500 is defined as 100 mm and the diameter of the fiber on the emission side is defined as 100 µm, the light is spread up to 100 mm as spaced away by a distance of 100 m.

Thus, since the magnitude of a measured ray bundle, which falls on the object to be measured, reaches several tens of mm or more, the non-prism type lightwave range finder 700 actually would measure a surface without measuring points on the surface of the measured object. Therefore, the measurement of the corners or the like of a building becomes unstable and hence the measurement of the surface becomes fundamental.

The operation of the automatic surveying equipment 1000 will now be described in detail.

An image sensed by the solid-state image pickup device 810 is converted to an image signal, which in turn is amplified by the pre-amplifier 830, followed by input to the arithmetic processing means 840 for recognition.

The arithmetic processing means 840 extracts an object corresponding to a target by executing built-in image processing software and makes a survey based on the result of extraction.

[When target Object Does not Come Within the Range of Telescope 100]:

There may be often cases in which when the magnification of the telescope 100 is normally high and the target object is a relatively large architecture such as a building, the target object does not come into the range of the telescope 100.

Figure 5:
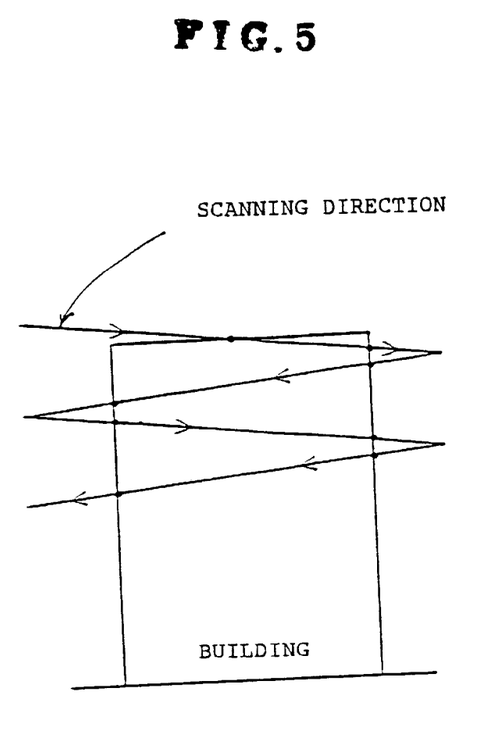
FIG. 5 is a diagram for describing a scanning direction in image processing of the present embodiment.

As shown in FIG. 5, the automatic surveying equipment 1000 is scanned in horizontal and vertical directions so that an image signal is produced from the solid-state image pickup device 810.

Further, the output signal of the solid-state image pickup device 810, which has been amplified by the pre-amplifier 830, is inputted to the arithmetic processing means 840 for recognition, where it is subjected to sampling and thereafter A/D converted into a digital video signal. The arithmetic processing means 840 converts the image signal to a binary image. While binarization based on fixed threshold values has been performed as by-level digitization or binarization used in the present embodiment, local binarization may be carried out.

Next, the arithmetic processing means 840 performs a filtering process to emphasize an edge. In the present embodiment, a difference filter is used to emphasize the edge. The difference filter is one wherein an edge in an image is emphasized by a computing method using differentiation as to close gradation or tonal values of a specific image or the difference therebetween.

While a linear filter and a non-linear filter are known as the difference filter, a linear one-dimensional space differential filter is adopted in the present embodiment. While a neighboring image (mask) is also suitably defined, the linear one-dimensional space differential filter is constructed by a 3*3 mask in the present embodiment.

Figure 6:
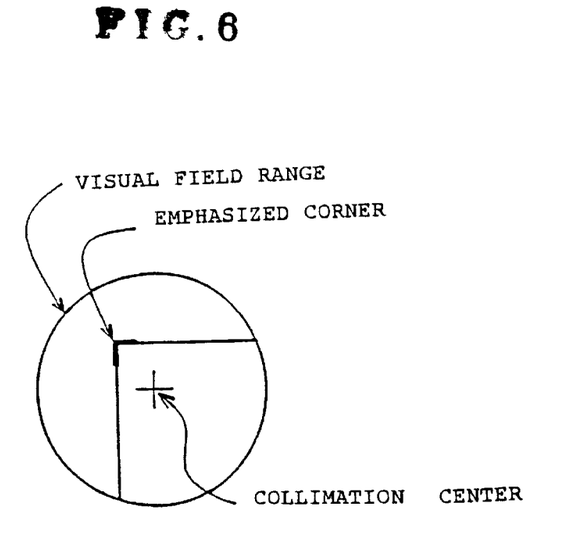
FIG. 6 is a diagram for describing a corner emphasized in the image processing of the present embodiment.

Next, as shown in FIG. 6, the corresponding corner of the target object is extracted from a concentration pattern in which each edge has been emphasized, and a collimation direction is specified from the position of an image at the corner and a collimation angle.

This operation is repeated to extract measuring points aligned in a predetermined layout, whereby a building corresponding to the target object is specified. Next, distances to three points on the plane of the building are measured, so that the plane can be specified. This three-dimensional measurement will be described in detail later.

Incidentally, when the target object is of a building, the telescope 100 is rotated and driven in such a manner that the corners of the building come into the range of the telescope 100.

Further, a filtering operation for emphasizing each edge is performed to determine a deviation corresponding to the difference between the corresponding corner of the extracted building and the center of collimation, whereby the position of the corner of the building can be specified.

Figure 7:
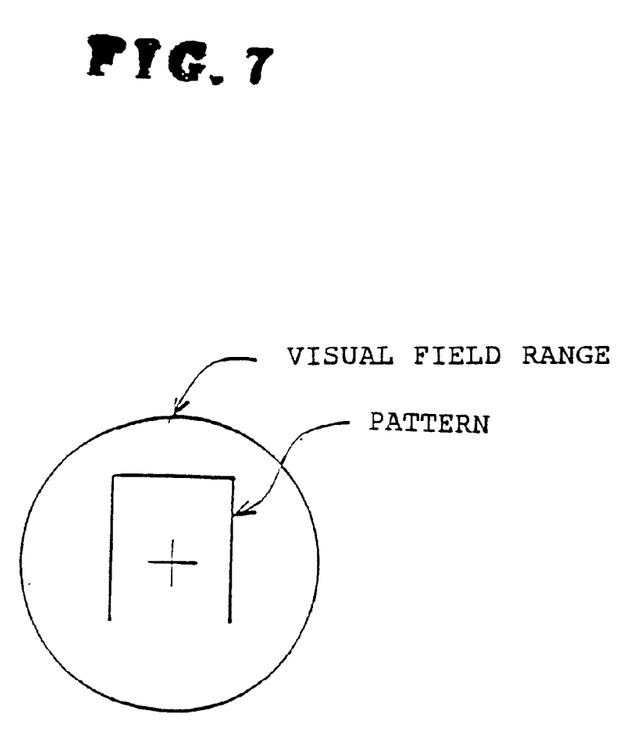
FIG. 7 is a diagram for describing a visual field range in the image processing of the present embodiment.

[When Target Object Comes Into the Range of Telescope 100]:

When the target object comes into the range of the telescope 100 as shown in FIG. 7, template matching can be used. The template matching is one wherein an input pattern and pre-stored standard patterns are superimposed on one another to thereby define the most-matched standard pattern as the result of identification of the input pattern.

Namely, a plurality of templates each substantially coincident with the form of the target object are stored. When an image corresponding to the target object coincides with one of patterns for the templates, a schematic image and position of the target object are specified.

A processing method is similar to the aforementioned method. First of all, a signal outputted from the solid-state image pickup device 810 is inputted to the arithmetic processing means 840 for recognition, where a filtering operation for emphasizing each edge is carried out and template matching is effected on a concentration pattern thereof, whereby the schematic image and position of the target object are specified.

This operation is repeated so that measured values for calculating the size, area, inclination, etc. of each plane of the building corresponding to the target object can be obtained.

When the template matching is performed, it is desirable that a zoom mechanism is provided such that template patterns having a plurality of sizes are stored or the target object falls within collimation.

As methods for facing the target object and the telescope 100 each other, there are known a method for facing the target object manually, and a method for allowing the external storage and display device such as the data collector 2000 to display map information and indicating a measured position of the target object on a map displayed based on the map information. Incidentally, when an automatically-based method is taken, it is necessary to allow the direction of map information to correspond to an actual direction.

The data collector 2000 connected to the automatic surveying equipment 1000 will next be explained. The data collector 2000 comprises a memory 2100 for storing measured data such as distances, angles, etc. measured by the automatic surveying equipment 1000 and images sensed by the solid-state image pickup device 810, a display unit 2200 for displaying the images sensed by the solid-state image pickup device 810 of the automatic surveying equipment 1000 and the measured data, a keyboard 2300 and a CPU 2400 for the data collector.

The CPU 2400 of the data collector 2000 and the microcomputer 900 of the automatic surveying equipment 1000 are connected to each other through a suitable interface. In this case, they are connected to each other by coupling a cable 2500 of the data collector 2000 to the input/output terminal 600 of the automatic surveying equipment 1000.

The display unit 2200 is composed of a liquid crystal display or the like and is electrically connected to the solid-state image pickup device 810 of the automatic surveying equipment 1000 through the pre-amplifier 830. This connection is also performed by making a connection to the input/output terminal 600 of the automatic surveying equipment 1000 through the use of the aforementioned cable 2500. The memory 2100 stores the result of a survey therein and stores map information therein. Further, the memory 2100 stores therein a program which serves as software for allowing the automatic surveying equipment 1000 to execute a predetermined surveying operation. Further, a display control circuit 2221 is electrically connected to the display unit 2200 and allows the display of the surveyed result and map information. Further, the operation of the automatic surveying equipment 1000 can be also displayed through the use of the display unit 2200.

The keyboard 2300 corresponds to input means for inputting instruction data, etc. The input means is not necessarily limited to the keyboard 2300. It may be constructed such that the data is inputted from a handwriting input device, another information processing device or the like.

Further, the microcomputer 900 computes a determinant to be described later to solve simultaneous equations and conducts the entire control of the automatic surveying equipment 1000.

Incidentally, the memory 2100 can be also constructed as a memory card or the like and corresponds to an electronic storage medium. The present electronic storage medium is not limited to the memory card. Any of external storage media such as a floppy disk, a CD, a DVD, an MO, etc. can be used.

The keyboard 2300 is used to allow a user to input instructions or necessary data. The display unit 2200 is used to monitor input instructions or data and display the result of computation thereon.

A three-dimensional measuring principle of the present invention will next be described in detail. [Principle]

The principle of the present invention will first be explained with reference to FIG. 8. Now consider where a lightwave range finder 1000, which does not make use of a corner cube, is first placed at a point 0 to measure a building 6000 which is an object to be measured. The building 6000 can be considered to be a rectangular parallelepiped. Respective surfaces thereof can be regarded as planes.

The corner cube-free lightwave range finder 1000 is of a type called integral-type [total station] capable of measuring distances and angles. Incidentally, the optical axis of a distance measuring unit of the corner cube-free lightwave range finder 1000 and a collimation system will be defined as coaxial with each other.

Points A, B and C on a α surface of the building 6000 are first measured. Data obtained at the respective points A, B and C result in data about distances and angles as viewed from a point of origin in three-dimensional space with a point 0 (corresponding to the point where the corner cube-free lightwave range finder 1000 is installed) as the point of origin. It is thus possible to obtain or determine the positions of coordinates of the respective points A, B and C in three-dimensional space. Since the plane including the three points in three-dimensional space is uniquely determined, the α surface containing the measured points A, B and C is uniquely determined.

The positions of the coordinates of the points A, B and C in three-dimensional space with the point 0 as the point of origin can be determined from the following equations.

If the coordinates of the point A are given as ($x_A$, $y_A$ and $z_A$), then they are represented as follows:

$$x_A = L_l$$

$$y_A = L_m \qquad \text{first equation}$$

$$z_A = L_n$$

where l: direction cosine in x direction when the point A is defined as collimation m: direction cosine in y direction when the point A is defined as collimation n: direction cosine in z direction when the point A is defined as collimation Further, if the coordinates of the points A, B and C are given as follows:

A: ($x_1$, $y_1$, $z_1$)

B: ($x_2$, $y_2$, $z_2$)

C: ($x_3$, $y_3$, $z_3$), then an equation for expressing the α surface corresponding to the plane is represented as follows:

$$\begin{bmatrix} x & y & z & 1 \\ x_A & y_A & z_A & 1 \\ x_B & y_B & z_B & 1 \\ x_C & y_C & z_C & 1 \end{bmatrix} = 0 \qquad \text{second equation}$$

An angle α of a plane in which one desires to measure its position, is next collimated. From angular data at this time, an equation indicative of a straight line which passes through the point 0 (corresponding to the point where the corner cube-free lightwave range finder 1000 is installed) and a collimation point a, can be represented as follows:

$$x/l = y/m = z/n \qquad \text{third equation}$$

where l: direction cosine in x direction m: direction cosine in y direction n: direction cosine in z direction Further, the coordinates of the collimation point a in three-dimensional space with the point 0 (corresponding to the point where the corner cube-free lightwave range finder 1000 is placed) as the point of origin, can be determined by solving the second and third equations as, simultaneous equations. Namely, the $x_A$ coordinate of the point a can be represented as follows:

$$\begin{bmatrix} x & m*x/l & n*x/l \\ x_A & y_A & z_A \\ x_B & y_B & z_B \\ x_C & y_C & z_C \end{bmatrix} = 0 \qquad \text{fourth equation}$$

The $y_A$ coordinate of the point a can be represented as follows:

$$\begin{vmatrix} l*y/m & y & m*y/n \\ x_A & y_A & z_A \\ x_B & y_B & z_B \\ x_C & y_C & z_C \end{vmatrix} = 0 \quad \text{fifth equation}$$

The $z_A$ coordinate of the point a can be represented as follows:

$$\begin{vmatrix} l*z/n & m*z/n & z \\ x_A & y_A & z_A \\ x_B & y_B & z_B \\ x_C & y_C & z_C \end{vmatrix} = 0 \quad \text{sixth equation}$$

Further, a distance $L_A$ between the point 0 (corresponding to the point where the corner cube-free lightwave range finder 1000 is placed) and the collimation point a is represented by the following equation:

$$L_A = (x_A^2 + y_A^2 + z_A^2)^{0.5} \quad \text{seventh equation}$$

Even in the case of b, c and d corresponding to other corners on the α surface, their positions on the three-dimensional coordinates can be obtained in the same manner as described above.

Thus, the positions on the three-dimensional coordinates, of a, b, c and d corresponding to other corners on the α surface can be determined.

Further, the lengths of the sides of the α surface, the area thereof, etc. can be determined by calculation based on the three-dimensional coordinates of the respective points a, b, c and d.

Arbitrary points on the plane can be determined without limitations to the angles of the plane in that since the equations indicative of the α surface corresponding to the plane have already been obtained, the positions of the three-dimensional coordinates can be indirectly determined from the angular data at collimation. Now consider a window 6100 in the building 6000, for example. If four points e, f, g and h thereof are measured, then three-dimensional coordinates thereof can be determined.

While the equations indicative of the α surface are computed using the data about the distances to and angles relative to the three points A, B and C, they are not limited to the three points. A least square method or the like may also be utilized through the use of data obtained by measuring four or more points, whereby high-accuracy measurements can be also carried out.

Figure 9:
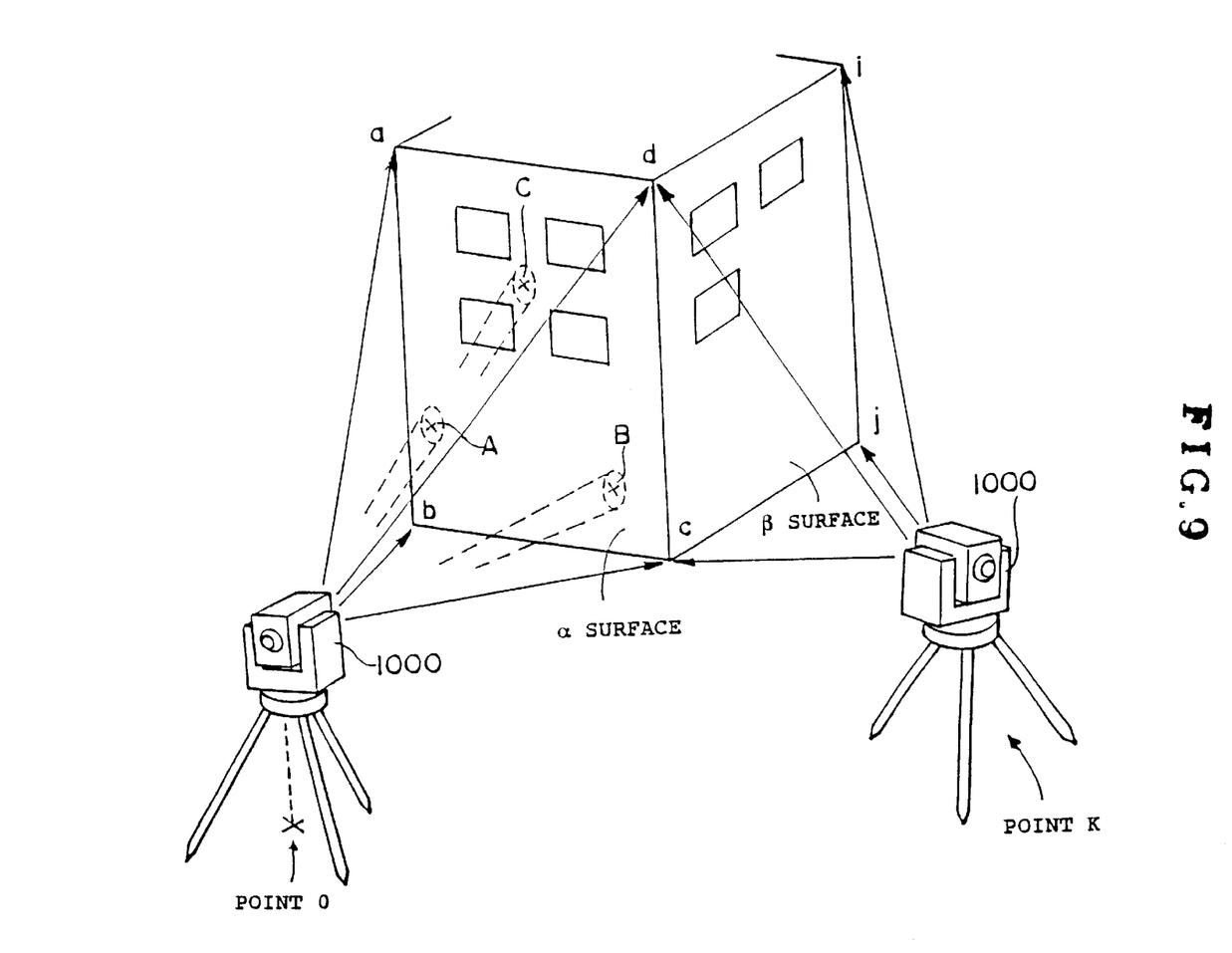
FIG. 9 is a diagram for describing the principle of the present invention.

The point where the corner cub-free lightwave range finder 1000 is installed, is next shifted from the point 0 to a point K as show in FIG. 9. If the α surface and a β surface corresponding to another plane are measured and measuring points (points c and d) common to the α surface are observed, an equation indicative of the β surface can be converted into form represented by the same three-dimensional coordinates as the equation indicative of the α surface. Thus, data on the β surface and data on the α surface can be represented by the same three-dimensional coordinates.

Further, if all the angles of the building 6000 are measured, it is then possible to determine the volume of the building 6000.

One example of the operation of the present embodiment will next be explained based on FIG. 10.

Figure 8:
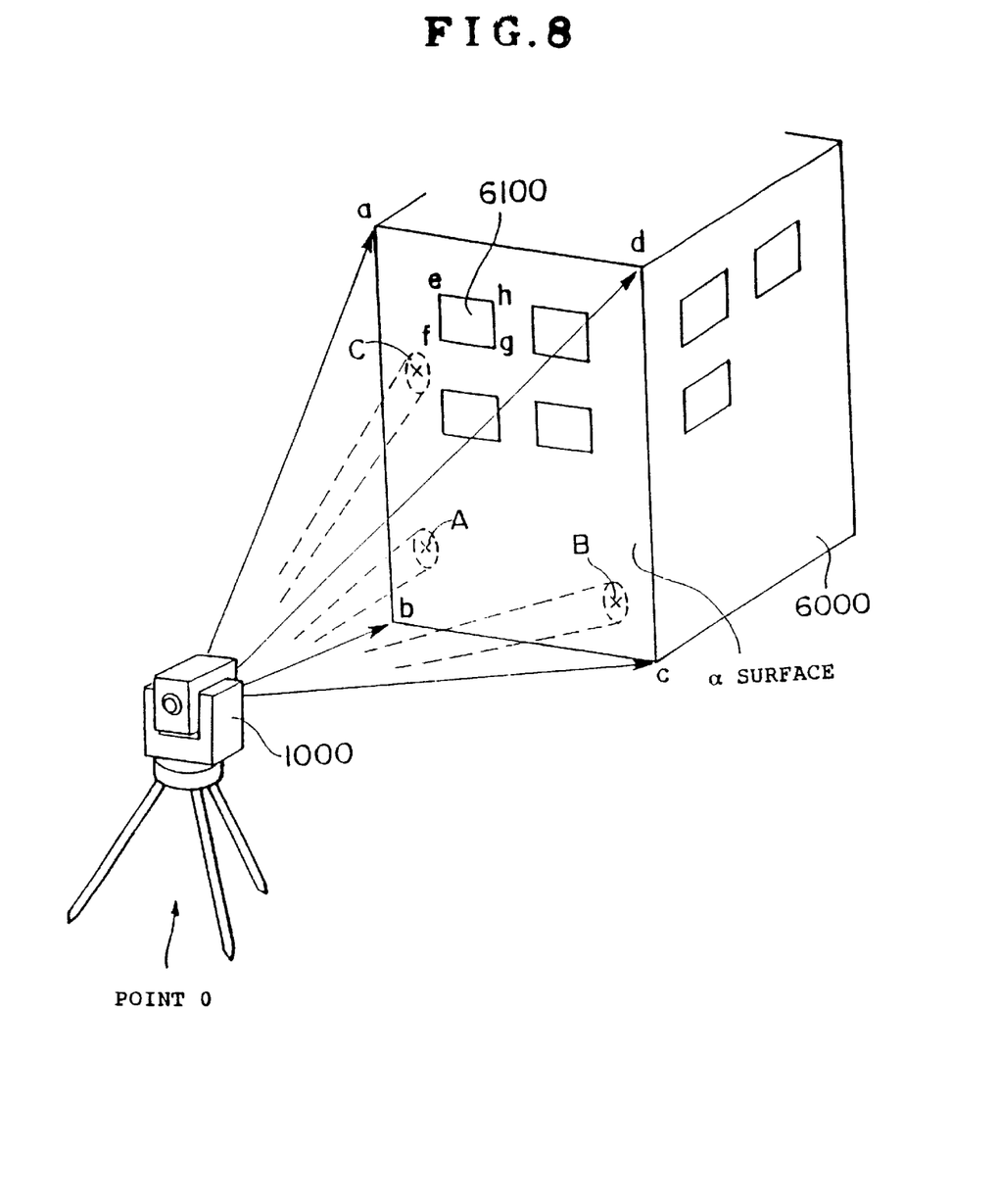
FIG. 8 is a diagram for describing the principle of the present invention.

First of all, in Step 1 (hereinafter abbreviated as S1), the points A, B and C on the α surface of the building 6000 shown in FIG. 8 are first measured to thereby obtain data about distances and angles as viewed from the lightwave range finder 1000.

Next, in S2, the aforementioned second equation is computed to calculate an equation for specifying the α surface including the three points A, B and C. Next, in S3, the four points, i.e., points a, b, c and d equivalent to the four corners of the α surface are collimated (their angles are measured). In S4, the fourth, fifth and sixth equations are solved to thereby compute the three-dimensional coordinates of the points a, b, c and d corresponding to the four corners of the α surface. In S5, the distances among the respective points a, b, c and d are further computed, and the area (corresponding to the area formed by the four corners of the α surface) of the α surface can be calculated.

Figure 11:
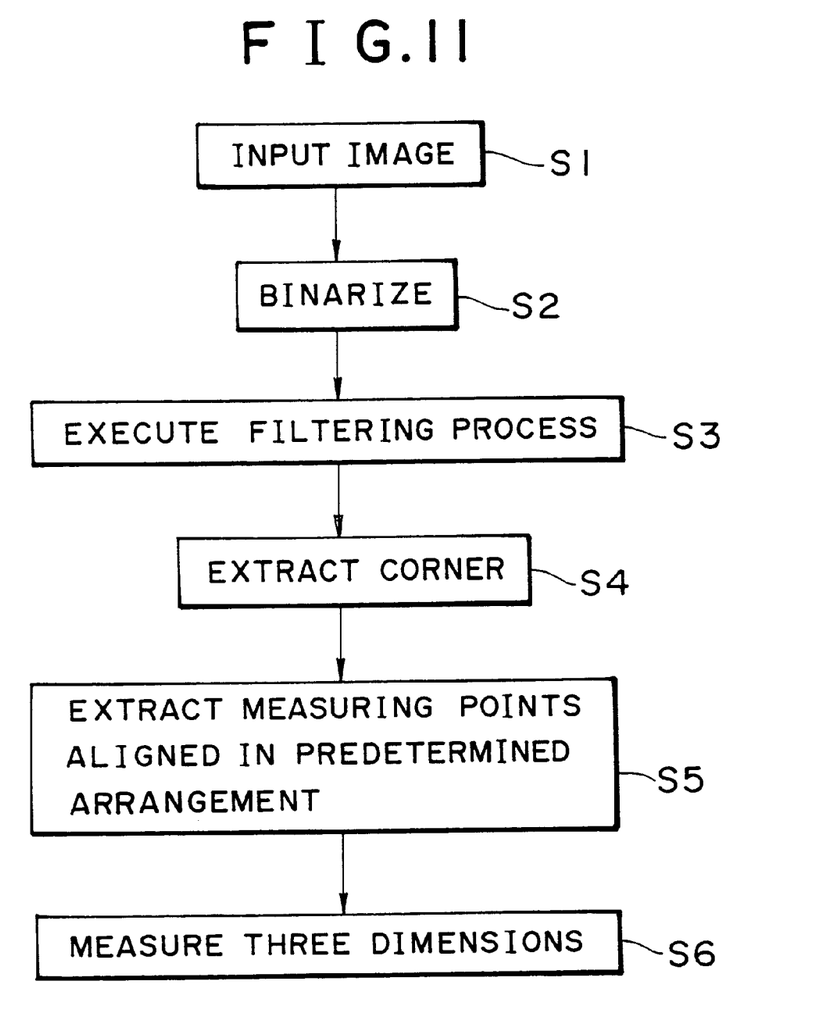
FIG. 11 is a diagram illustrating another operation of the present embodiment.

Thus, automatic surveying can be carried out by connecting image processing and a three-dimensional measurement to each other as shown in FIG. 11.

Namely, in S1, a signal outputted from the solid-state image pickup device 810 is inputted to the arithmetic processing means 840 for recognition, where it is subjected to sampling and thereafter A/D converted into a digital video signal. Next, in S2, the arithmetic processing means 840 converts the image signal to a binary image.

In S3, the arithmetic processing means 840 performs an image filtering process to emphasize each edge.

Next, in S4, the arithmetic processing means 840 extracts the corresponding corner of a target object from a concentration pattern in which each edge has been emphasized, and specifies a collimation direction from the position of an image at the corner and a collimation angle.

In S5, this operation is further repeated to extract measuring points aligned in a predetermined layout, whereby a building corresponding to the target object is specified.

Figure 10:
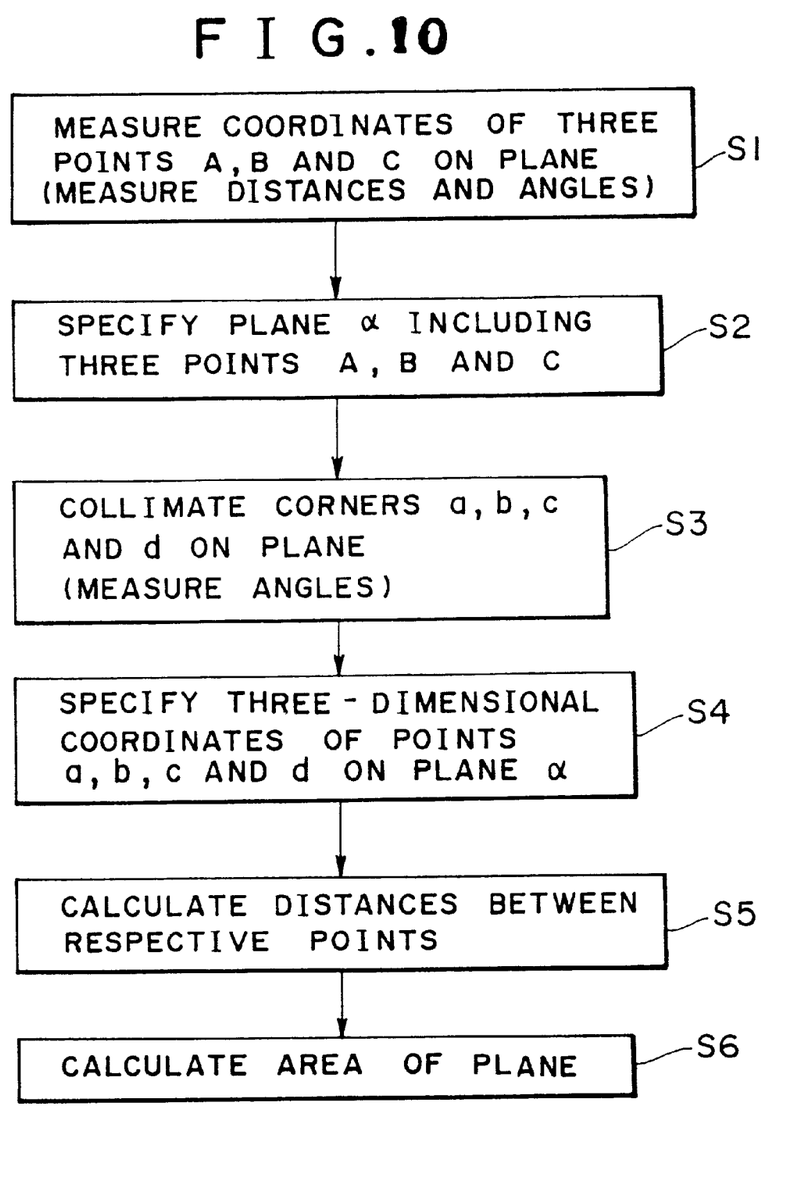
FIG. 10 is a diagram showing one example of the operation of the present embodiment.

Next, in S6, the three-dimensional measurement shown in FIG. 10 is performed so that a plane can be specified.

The present invention constructed as described above brings about an excellent effect in that since a non-prism measurable lightwave range finder has an angle measuring unit and a distance measuring unit, arithmetic processing means for recognition can recognize an object to be measured according to image processing, the angle measuring unit and the distance measuring unit can respectively measure distances to and angles relative to at least three specified points on a plane α including measuring points of the object to be measured, the angle measuring unit can measure angles relative to each individual measuring points, and a computing unit can determine an equation for specifying the plane α from the distances to and angles relative to the specified points, determine an equation indicative of a straight line for connecting the measuring points from the angles relative to the measuring points, and compute a measuring point corresponding to a point where the plane α and the straight line intersect, coordinates or the like can be automatically measured even at difficult-to-measure locations as in the case of the corners or the like.

While the present invention has been described with reference to the illustrative embodiment, this description is not intended to construe in a limiting sense. Various modifications of the illustrative embodiment, as well as other embodiments of the invention, will be apparent to those skilled in the art on reference to this description. It is therefore contemplated that the appended claims will cover any such modifications or embodiments as fall within the true scope of the invention.

What is claimed is:

1. An automatic survey apparatus, comprising:
   an angle measuring unit arranged to measure angle to a collimating direction;
   a non-prism type optical distance measuring unit for measuring distance to a measuring point on an object in said collimating direction;
   an image detector for detecting an image of said object in said collimating direction and providing image data;
   a processor programmed to receive and process said image data to recognize features on a first plane of said object and the direction of said features from said survey apparatus, said processor being further programmed to receive data from said angle measuring unit and said distance measuring unit corresponding to at least three measuring points on said first plane of said object and compute a mathematical representation of said first plane whereby said features can be located.

2. The automatic survey apparatus as defined in claim 1, wherein said processor is programmed to emphasize an edge according to a filtering operation and extract collimating points aligned in a predetermined arrangement to thereby recognize features on said object.

3. The automatic surveying apparatus as defined in claim 1, wherein said processor is programmed to emphasize an edge according to a filtering operation and recognize features on said object to be measured according to template matching.

4. The automatic surveying apparatus as defined in any one of claims 1, 2 or 3, wherein said object to be measured is a three-dimensional object, said first plane is one surface of the three-dimensional object, and the features are corners on said first plane.

5. The automatic surveying apparatus as defined in claim 1, wherein the features are two collimating points and said computing unit computes three-dimensional coordinates of the two collimating points and computes the distance between the two collimating points.

6. The automatic surveying apparatus as defined in claim 1, wherein the features are at least three collimating points and said computing unit computes three-dimensional coordinates of at least the three collimating points and computes an area surrounded by these points.

7. The automatic surveying apparatus as defined in claim 1, wherein the direction of the object to be measured is inputted from map information.

8. A three dimensional measuring method comprising:
   detecting an image of an object from an origin point and deriving image data representing said image;
   measuring the distance and angle from said origin point to three measuring points on a plane of said object using a non-prism type optical distance measuring unit;
   deriving data representing said plane on said object from said distance and angle of said three measuring points; and
   processing said image data to recognize and locate collimating points on said object in said plane.

9. The three-dimensional measuring method as defined in claim 8, wherein said image data processing comprises emphasizing an edge according to a filtering operation and extracting collimating points aligned in a predetermined arrangement to thereby recognize said object.

10. The three-dimensions measuring method as defined in claim 8, wherein said image data processing comprises emphasizing an edge according to a filtering operation and recognizing an object to be measured according to template matching.

11. The three-dimensions measuring method as defined in claim 8, wherein said origin is a point where a surveying apparatus is installed.

12. The three-dimensions measuring method as defined in claim 8, wherein said object to be measured is a three-dimensional object, the plane is one surface of said three-dimensional object, and the collimating points are corners on the plane.

13. The three-dimensions measuring method as defined in claim 8, wherein the collimating points are two points and further including computing three-dimensional coordinates of the two points and computing the distance between the two points.

14. The three-dimensions measuring method as defined in claim 8, wherein the collimating points are at least three points and further including computing three-dimensional coordinates of at least the three points and computing an area surrounded by these points.

15. A three dimensional measuring method for measuring an object having a first plane and a second plane with at least two points common to said first and second planes, comprising:
    detecting at least one image of said object from at least one origin point and deriving image data representing said image;
    measuring the distance and angle from said origin point to three measuring points on each of said first and second planes using a non-prism type optical distance measuring unit;
    deriving data representing said first and second planes from said distance and angle of said measuring points;
    processing said image data to recognize and locate collimating points on said object including said points common to said first and second planes.

16. The three-dimensions measuring method as defined in claim 15, wherein said at least one origin point is a point where a surveying apparatus is installed.

17. The three-dimensions measuring method as defined in claim 15, wherein said measuring points are four or more points on each plane and each of said planes is specified by a least square method.

18. The three-dimensions measuring method as defined in any one of claims 8 or 15, wherein the direction of the object to be measured is inputted from map information.

19. An electronic storage medium, such as a memory card, a floppy disk, a CD, a DVD, MO or the like to which programs are affixed for causing a computer implemented data processor to receive image data representing an image of an object to be measured, to receive data representing the direction and distance of at least three measuring points on a plane of said object, to compute data representing said plane, and to process said image data to recognize and locate collimating points on said object in said plane.

20. An electronic storage medium, such as a memory card, a floppy disk, a CD, a DVD, MO or the like to which programs are affixed for causing a computer implemented data processor to receive image data representing at least one image of an object to be measured, to receive data representing the direction and distance of at least three measuring points on each of first and second planes of said object, to compute data representing said planes, and to process said image data and said data representing said planes to recognize and locate collimating points on said object.

21. An electronic storage medium, as defined in claim 20 wherein at least two collimating points on the first plane and on the second plane are common.

22. An electronic storage medium, as defined in claim 19 or claim 20 wherein the object to be measured is a three-dimensional object, the plane is one surface of the three-dimensional object, and the collimating points are corners on the plane.

23. An electronic storage medium, as defined in claim 19 or claim 20 wherein the collimating points are two points and said computer implemented data processor computes three-dimensional coordinates of the two points and computes the distance between the two points.

24. An electronic storage medium, as defined in claim 19 or 20 wherein the collimating points are at least three points and said computer implemented data processor computes three-dimensional coordinates of at least the three points and computes an area surrounded by these points.

* * * * *